United States Patent
Samanta et al.

(10) Patent No.: US 12,238,822 B2
(45) Date of Patent: Feb. 25, 2025

(54) AUTOMATED SUBSCRIPTION MANAGEMENT FOR REMOTE INFRASTRUCTURE

(71) Applicant: Dell Products L.P., Round Rock, TX (US)

(72) Inventors: Sisir Samanta, Bangalore (IN); Shibi Panikkar, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 252 days.

(21) Appl. No.: 17/941,657

(22) Filed: Sep. 9, 2022

(65) Prior Publication Data

US 2024/0089722 A1 Mar. 14, 2024

(51) Int. Cl.
*H04W 8/20* (2009.01)
*H04L 41/0686* (2022.01)
*H04W 8/18* (2009.01)

(52) U.S. Cl.
CPC ........... *H04W 8/20* (2013.01); *H04L 41/0686* (2013.01); *H04W 8/183* (2013.01)

(58) Field of Classification Search
CPC ...... H04W 8/20; H04W 8/183; H04L 41/0686
See application file for complete search history.

(56) References Cited

U.S. PATENT DOCUMENTS 11,163,637 B1* 11/2021 Bikumala ........... G06F 11/0793
11,810,026 B2* 11/2023 Stillwell ............. G06Q 10/04
11,843,549 B1* 12/2023 Maikhuri ............... H04L 41/16
12,026,664 B2* 7/2024 Cornejo Barriere ... G06N 20/20
12,039,475 B2* 7/2024 Panikkar ............ G06Q 30/0201
2020/0336388 A1* 10/2020 Dome ................. H04L 41/5045

(Continued)

OTHER PUBLICATIONS

Utility Configuration Collector Metering: Overview & Requirements, Dell Technologies, available at: https://dl.dell.com/content/docu93453_ucc-2-0-metering-overview-and-requirements.pdf?language=en-us (last accessed Apr. 25, 2022), published Oct. 14, 2021.

(Continued)

*Primary Examiner* — Adam D Houston
(74) *Attorney, Agent, or Firm* — Ryan, Mason & Lewis, LLP

(57) ABSTRACT

Methods, apparatus, and processor-readable storage media for automated subscription management for remote infrastructure are provided herein. An example computer-implemented method includes obtaining subscription data related to at least one subscription for hardware infrastructure provided by a service provider, wherein the subscription data is obtained by the hardware infrastructure at a remote location; obtaining usage data and deployment data for the hardware infrastructure that is associated with the at least one subscription; processing the subscription data, the usage data and the deployment data using an artificial intelligence-based framework to identify a time period for initiating performance of one or more actions to automatically adjust the at least one subscription, wherein the artificial intelligence-based framework identifies the time period based on historical subscription data related to one or more other subscriptions; and causing the performance of the one or more actions to be initiated within the identified time period.

20 Claims, 6 Drawing Sheets

(56) References Cited

U.S. PATENT DOCUMENTS

| | | | | |
|---|---|---|---|---|
| 2021/0064981 | A1* | 3/2021 | Turgeman | G06N 3/084 |
| 2021/0357123 | A1* | 11/2021 | Kulkarni | G06F 3/0605 |
| 2021/0406140 | A1* | 12/2021 | Sethi | G06F 11/3006 |
| 2022/0342952 | A1* | 10/2022 | Panikkar | G06N 7/01 |
| 2022/0358451 | A1* | 11/2022 | Huang | G06Q 10/087 |
| 2023/0153681 | A1* | 5/2023 | Kyanam | G06N 5/01 |
| | | | | 706/12 |
| 2023/0216876 | A1* | 7/2023 | Pieczul | H04L 41/5058 |
| | | | | 709/223 |
| 2023/0229543 | A1* | 7/2023 | Mohanty | G06N 3/08 |
| | | | | 714/48 |
| 2023/0281682 | A1* | 9/2023 | Milojicic | G06Q 30/04 |
| | | | | 705/34 |
| 2023/0393829 | A1* | 12/2023 | Panikkar | G06F 11/3409 |
| 2024/0089722 | A1* | 3/2024 | Samanta | H04W 8/20 |
| 2024/0211779 | A1* | 6/2024 | Conchuir | G06N 5/04 |
| 2024/0264867 | A1* | 8/2024 | Sethi | G06F 9/5016 |

OTHER PUBLICATIONS

Meiers, Jason, Cloud metering and billing:Billing metrics for compute resources in the cloud, International Business Machines Corporation, available at: https://developer.ibm.com/articles/cl-cloudmetering/ (last accessed Jun. 6, 2022), published Aug. 8, 2011.

* cited by examiner

| Subscription | Workload | Class | Period | Type | M13 | M14 | M15 | M16 | M17 | M18 | M19 | M20 | M21 | M22 | M23 | M24 |
|---|---|---|---|---|---|---|---|---|---|---|---|---|---|---|---|---|
| Sub-1 | Analytics | Prod | 36 | Fixed | 700 | 750 | 775 | 800 | 810 | 805 | 800 | 800 | 800 | 800 | 800 | 800 |
| Sub-2 | eComm | Prod | 1 | Consum. | 90 | 110 | 110 | 120 | 120 | 120 | 120 | 120 | 120 | 120 | 120 | 120 |
| Sub-3 | ERP | Prod | 12 | Reserve | 171 | 184 | 197 | 207 | 216 | 224 | 231 | 238 | 244 | 250 | 255 | 260 |
| Sub-4 | Analytics | Pre-Prod | 36 | Fixed | 150 | 160 | 170 | 180 | 190 | 200 | 210 | 220 | 230 | 240 | 250 | 260 |
| Sub-5 | eComm | Pre-Prod | 1 | Consum. | 54 | 57 | 60 | 63 | 66 | 69 | 72 | 75 | 78 | 81 | 84 | 87 |
| Sub-6 | ERP | Pre-Prod | 12 | Reserve | 85 | 94 | 104 | 113 | 123 | 132 | 142 | 151 | 161 | 170 | 180 | 189 |
| Sub-7 | Analytics | Dev | 36 | Fixed | 90 | 95 | 100 | 105 | 110 | 115 | 120 | 125 | 130 | 135 | 140 | 145 |
| Sub-8 | eComm | Dev | 1 | Consum. | 20 | 21 | 22 | 23 | 24 | 25 | 26 | 27 | 28 | 29 | 30 | 31 |
| Sub-9 | ERP | Dev | 12 | Reserve | 89 | 99 | 108 | 118 | 127 | 137 | 146 | 156 | 165 | 175 | 184 | 194 |
| Sub-10 (New) | Analytics | Prod | 12 | Consum. | 50 | 70 | 100 | 150 | 200 | 250 | 300 | 350 | 400 | 450 | 500 | 550 |
| Sub-11 (New) | eComm | Pre-Prod | 1 | Consum. | 18 | 21 | 24 | 27 | 30 | 33 | 36 | 39 | 42 | 45 | 48 | 51 |
| Sub-12 (New) | Analytics | Dev | 36 | Consum. | 50 | 55 | 60 | 64 | 67 | 69 | 69 | 65 | 60 | 50 | 40 | 30 |

300

MONTHS

FIG. 3

AUTOMATED SUBSCRIPTION MANAGEMENT FOR REMOTE INFRASTRUCTURE

FIELD

The field relates generally to information processing systems, and more particularly to processing data associated with remote infrastructure related to such systems.

BACKGROUND

Service providers often deploy managed storage and/or server infrastructure at a customer location, and the customer pays for the usage of the infrastructure using a subscription-based model. It may be difficult with existing techniques for managing such infrastructure for the service provider to obtain information from the customer location related to, for example, usage of the deployed infrastructure and/or the types of applications associated with the deployed infrastructure.

SUMMARY

Illustrative embodiments of the disclosure provide techniques for automated subscription management for remote infrastructure. An exemplary computer-implemented method includes obtaining subscription data related to at least one subscription for hardware infrastructure provided by a service provider, wherein the subscription data is obtained by the hardware infrastructure at a remote location; obtaining usage data and deployment data for the hardware infrastructure that is associated with the at least one subscription; processing the subscription data, the usage data and the deployment data using an artificial intelligence-based framework to identify a time period for at least initiating performance of one or more actions to automatically adjust the at least one subscription, wherein the artificial intelligence-based framework identifies the time period based at least in part on historical subscription data related to one or more other subscriptions; and causing the performance of the one or more actions to be initiated within the identified time period.

Illustrative embodiments can provide significant advantages relative to conventional techniques for managing subscriptions for remote infrastructure. For example, technical problems associated with conventional subscription management techniques are mitigated in one or more embodiments by identifying potential issues with a given subscription for remote infrastructure and making proactive adjustments to avoid such issues based on, for example, usage data, application types, and deployment classes associated with the hardware infrastructure.

These and other illustrative embodiments described herein include, without limitation, methods, apparatus, systems, and computer program products comprising processor-readable storage media.

BRIEF DESCRIPTION OF THE DRAWINGS

FIG. 3 shows an example of subscription and usage data for a particular entity in an illustrative embodiment.

DETAILED DESCRIPTION

Figure 1:
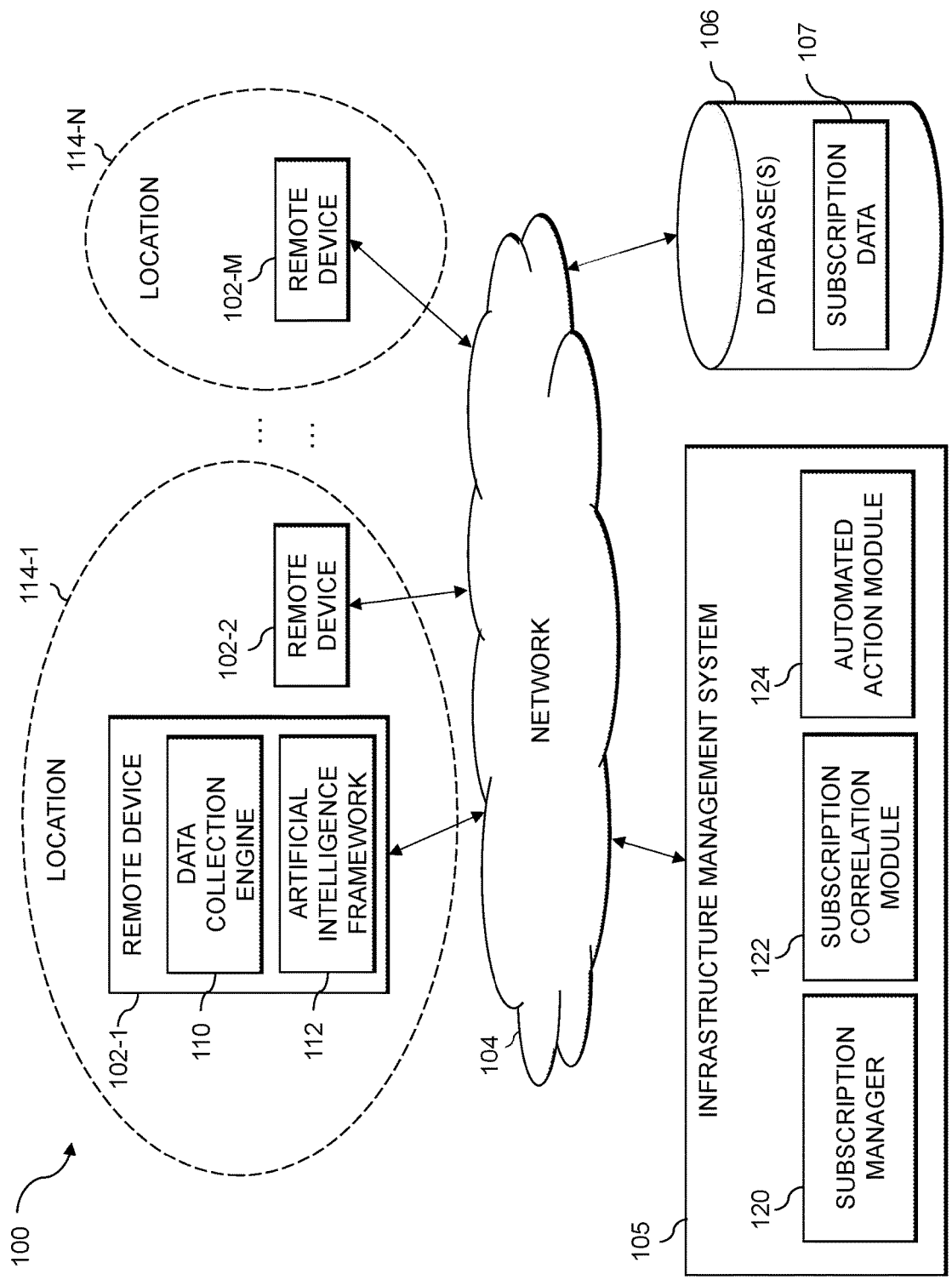
FIG. 1 shows an information processing system configured for automated subscription management for remote infrastructure in an illustrative embodiment.

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Hybrid and private on-premises clouds can offer advantages to enterprises relative to public clouds in terms of compliance, privacy, and security, for example. However, setting up and maintaining the infrastructure for such clouds can be technically challenging and expensive. To address such issues, service providers are increasingly offering private clouds using a pay-as-you-go subscription model. For example, a given service provider can deploy and manage hardware infrastructure for a private cloud at a customer location. In such situations, the service provider often does not have access, or has only limited access, to information related to user behavior and the types of applications associated with the hardware infrastructure as this information often resides behind a firewall at the customer location. This makes it technically difficult for the service provider to determine when there are issues with a given subscription and when to initiate actions to address such issues.

Canceled subscriptions cause further challenges because the service provider may need to retrieve the hardware components from the customer location. Also, different customers that are subscribed to the same offer can have different usage and/or be provided with different hardware components. For example, a particular type of hardware infrastructure can be used for critical applications by a first customer and can be used for logging storage data by another customer. As another example, one customer may have a subscription for managed hardware infrastructure that requires a large amount of computing and storage resources, and another customer may have a subscription for a large amount of computing resources, but a small amount of storage resources. Accordingly, information related to workload types, application criticality, and data usage may be needed to effectively manage subscriptions and retain customers.

Tools that are designed for public clouds for these types of issues are difficult to apply in the context of hybrid and/or private clouds. In particular, public cloud service providers have control over their respective infrastructure, and thus can generally access customer information and usage data. Also, there is no hardware infrastructure that needs to be retrieved in the context of public clouds if a customer cancels a subscription.

Managing subscriptions of private and/or hybrid clouds generally rely on usage data. For example, usage data for remotely managed infrastructure can be collected at the customer location and then can be sent back to a central location (e.g., a central server and/or the cloud) to be processed. If a given service provider identifies an issue with the subscription (e.g., a decline in usage), then the service provider can engage the customer to address the issue. However, obtaining a real-time (or substantially real-time) view of the usage data is challenging as the usage data is often collected from different geographic customer locations. Accordingly, such techniques often fail to identify such issues quickly enough to take any action.

Additionally, processing the data at the central location can also be complex due to the number of customers, where each customer may have different combinations of subscription services (e.g., multiple different compute and/or storage subscriptions). The geographic regions may also have different rate types or terms. Such techniques also often fail to consider a number of factors that can affect the proper time period to engage the customer (e.g., with respect to seasonality; business models; offer and/or product data; contract types; rate card model; promotions; usage and/or billing patterns; and/or mean time to recover (MTTR)), which can cause the subscription to be managed improperly (e.g., by triggering one or more unnecessary actions).

At least some exemplary embodiments described herein include obtaining and processing data associated with a given subscription for managed hardware infrastructure to efficiently identify a time period to perform one or more actions for the given subscription. As used herein, the term "time period to perform one or more actions" shall be broadly construed to encompass actions initiated within the time period but not necessarily completed within the time period, as would be apparent to a person of ordinary skill in the art.

In some embodiments, a plurality of subscriptions can be tagged with respective time periods based on priorities (or impacts) computed for the subscriptions. Such embodiments allow subscriptions to be managed in an efficient and more accurate manner.

FIG. 1 shows a computer network (also referred to herein as an information processing system) 100 configured in accordance with an illustrative embodiment. The computer network 100 comprises a plurality of remote devices 102-1, 102-2, . . . 102-M, collectively referred to herein as remote devices 102. The remote devices 102 are coupled to a network 104, where the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment. Also coupled to network 104 is an infrastructure management system 105.

The remote devices 102 may comprise, for example, servers and/or portions of one or more server systems, as well as devices such as mobile telephones, laptop computers, tablet computers, desktop computers or other types of computing devices associated with respective users. Such devices are examples of what are more generally referred to herein as "processing devices." Some of these processing devices are also generally referred to herein as "computers."

Also, it is to be appreciated that the term "user" in this context and elsewhere herein is intended to be broadly construed so as to encompass, for example, human, hardware, software or firmware entities, as well as various combinations of such entities.

The remote devices 102 in some embodiments may comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, the infrastructure management system 105 can have at least one associated database 106 configured to store subscription data 107 pertaining to, for example, hardware and/or services associated with one or more of the remote devices 102. Also, at least a portion of the one or more remote devices 102 can also have at least one associated database (not explicitly shown in FIG. 1).

An example database 106, such as depicted in the present embodiment, can be implemented using one or more storage systems associated with the infrastructure management system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Each of the remote devices 102 is assumed to be located at a location of a particular customer. In the FIG. 1 embodiment, locations 114-1, . . . 114-N (collectively, locations 114) are represented using dashed circles, and each location 114 corresponds to, for example, one of a plurality of customers (e.g., customer 1, . . . customer X). More specifically, the example in FIG. 1 shows that remote devices 102-1 and 102-2 are located within location 114-1 of a first customer, and remote device 102-M is located within location 114-N of a different customer. It is to be appreciated, however, that each customer may be associated with more than one of the locations 114. Thus, in other examples, the remote device 102-1 may be in a first one of the locations 114 corresponding to the first customer, and the remote device 102-2 may be in a different one of the locations 114 that also corresponds to the first customer. It is also assumed that at least a portion of the locations 114 are remote from the infrastructure management system 105. In other embodiments, it is possible for one or more of the remote devices 102, the infrastructure management system 105, and/or the at least one database 106 to be implemented at least in part in one or more same locations.

The infrastructure management system 105 includes a subscription manager 120, a subscription correlation module 122, and an automated action module 124. Generally, the subscription manager 120 manages subscription and product information associated with each of the customers. The subscription correlation module 122 can correlate usage and application data associated with one or more of the remote devices 102 with historical data (e.g., corresponding to one or more other customers). The automated action module 124, in some embodiments, can trigger at least one action to be performed based at least in part on the identified time period and the correlation with historical data, as explained in more detail elsewhere herein.

It is to be appreciated that this particular arrangement of elements 120, 122, and 124 illustrated in the infrastructure management system 105 of the FIG. 1 embodiment is presented by way of example only, and alternative arrangements can be used in other embodiments. For example, the functionality associated with the elements 120, 122, and 124 in other embodiments can be combined into a single element, or separated across a larger number of elements. As another example, multiple distinct processors can be used to implement different ones of the elements 120, 122, and 124 or portions thereof.

At least portions of elements 120, 122, and 124 may be implemented at least in part in the form of software that is stored in memory and executed by a processor.

Also associated with the infrastructure management system 105 are one or more input-output devices, which illustratively comprise keyboards, displays or other types of input-output devices in any combination. Such input-output devices can be used, for example, to support one or more user interfaces to the infrastructure management system 105, as well as to support communication between infrastructure management system 105, the remote devices 102, and other related systems and devices not explicitly shown.

Additionally, the infrastructure management system 105 in the FIG. 1 embodiment is assumed to be implemented using at least one processing device. Each such processing device generally comprises at least one processor and an associated memory, and implements one or more functional modules for controlling certain features of the infrastructure management system 105.

More particularly, the infrastructure management system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the infrastructure management system 105 to communicate over the network 104 with the remote devices 102, and illustratively comprises one or more conventional transceivers.

In some embodiments, each of the remote devices 102 can be implemented in a similar manner as described above for the infrastructure management system 105. In at least some embodiments, the remote devices 102-1 and 102-2 may correspond to hardware infrastructure for implementing at least a portion of a private and/or hybrid cloud for the first customer. In such an example, the hardware infrastructure (e.g., storage and/or server infrastructure) can be managed by a service provider associated with the infrastructure management system 105.

In the FIG. 1 example, the remote device 102-1 includes a data collection engine 110 and an artificial intelligence framework 112. The data collection engine 110 is used to collect usage data and cluster information corresponding to the remote device 102-1, and possibly one or more other remote devices 102 within location 114-1 (such as remote device 102-2). For example, in some embodiments, the data collection engine 110 can receive relevant subscription data 107 via the infrastructure management system 105, and the cluster information (e.g., application workloads and/or classes of deployments) can be collected from each of the remote devices 102 that are associated with the subscription. The subscription data 107 can be sent from the infrastructure management system 105 to the data collection engine 110 via a machine-to-machine protocol, for example. In some embodiments the machine-to-machine protocol may comprise a MQTT (Message Queue Telemetry Transport) protocol.

The artificial intelligence framework 112 may execute one or more artificial intelligence-based processes to identify a time period for taking one or more actions with respect to a given subscription of the customer based on the usage data, the application data, and the received subscription data 107, for example. In some embodiments, the artificial intelligence framework 112 sends a notification (e.g., via the machine-to-machine protocol) of the identified time period to the infrastructure management system 105 for managing the given subscription, as explained in more detail elsewhere herein. Non-limiting examples of actions that can be performed for a given subscription include: triggering a notification to another system, such as an entity management system (not explicitly shown in FIG. 1); automatically adjusting one or more terms associated with the subscription (e.g., a contract length and/or usage thresholds); and generating and sending one or more promotions related to the subscription to the customer.

It is to be appreciated that, in some embodiments, the data collection engine 110 and/or the artificial intelligence framework 112 may be implemented using one or more of the remote devices 102 in location 114-1. In some examples, it is assumed that at least one data collection engine 110 and at least one artificial intelligence framework 112 are implemented on at least one of the remote devices 102 in each of the locations 114 (not explicitly shown in FIG. 1).

It is to be understood that the particular set of elements shown in FIG. 1 for infrastructure management system 105 involving remote devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, one or more of the infrastructure management system 105 and database(s) 106 can be on and/or part of the same processing platform.

Exemplary processes utilizing data collection engine 110 and artificial intelligence framework 112 of an example remote device 102-1 in computer network 100 and elements 120, 122, and 124 of an example infrastructure management system 105 in computer network 100 will be described in more detail with reference to, for example, FIGS. 2 and 4.

According to at least some embodiments, a time period and a level of engagement can be identified for a given subscription involving hardware infrastructure based on multiple factors. The factors can include, for example, one or more of: usage patterns, workloads (e.g., types of applications running on the hardware infrastructure), contract periods (committed contract duration and next renewal date), and rate card types (indicating type of price commitment). In some embodiments, the usage patterns can be derived based on usage data with respect to holidays, seasons, and/or buying patterns.

Figure 2:
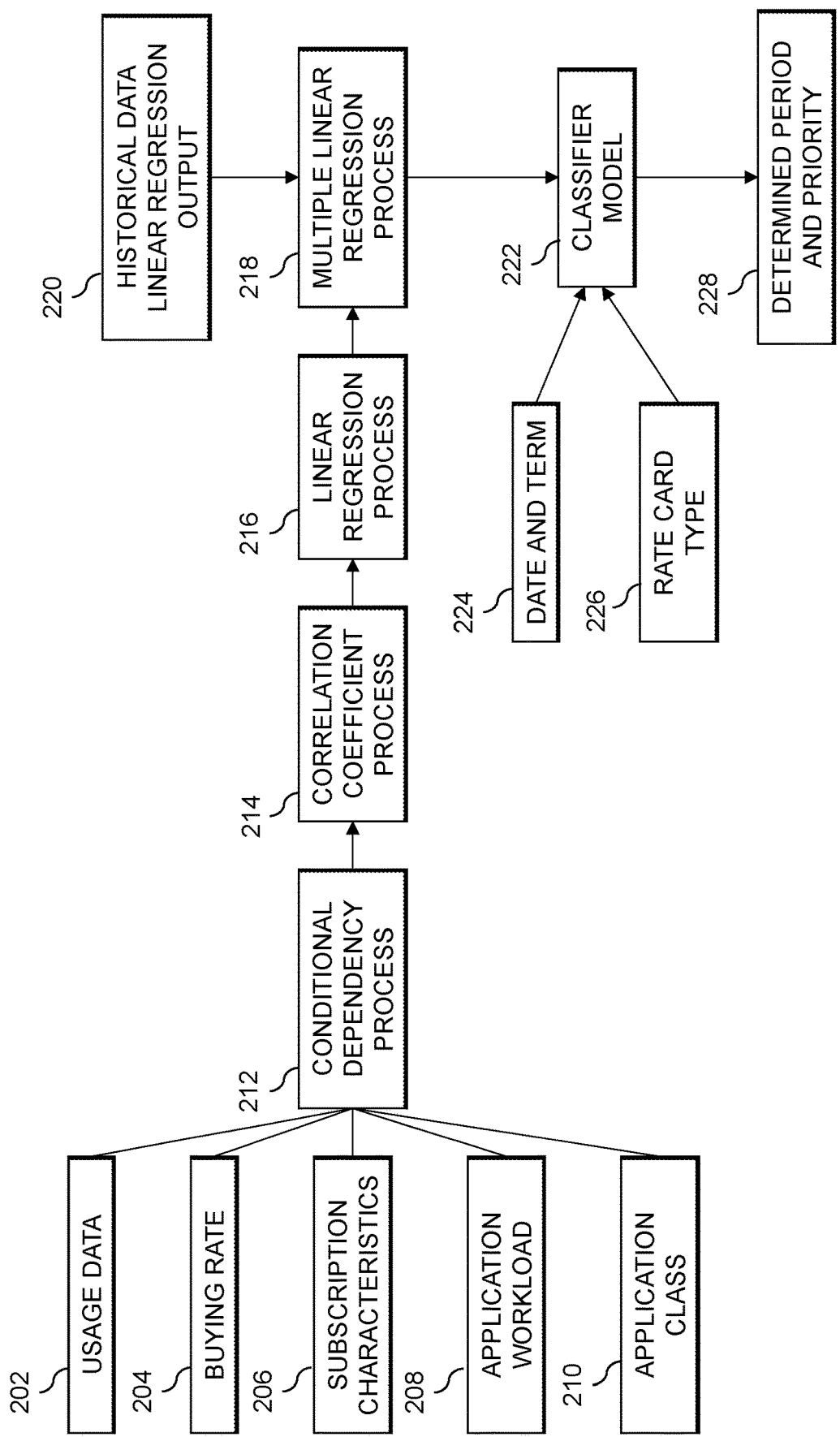
FIG. 2 shows a schematic diagram of a framework for predicting a time period and priority for a given subscription in an illustrative embodiment.

FIG. 2 shows a schematic diagram of a framework for predicting a time period and priority for a given subscription in an illustrative embodiment. The FIG. 2 example shows a conditional dependency process 212, a correlation coefficient process 214, a linear regression process 216, a multiple linear regression process 218, and a classifier model 222. In this example, it is assumed that processes 212, 214, and 216 are implemented at least in part by an artificial intelligence framework 112 of remote device 102-1, and the infrastructure management system 105 is assumed to implement the multiple linear regression process 218 and the classifier model 222 utilizing at least in part its elements 120 and 122.

For a given subscription, the conditional dependency process 212 obtains inputs comprising: usage data 202 corresponding to one or more hardware components (e.g., one or more of remote devices 102) associated with the given subscription, a buying rate 204 of the customer, subscription characteristics 206, an application workload 208, and an application class 210. The buying rate 204 can indicate, for example, the frequency with which the customer purchases from the service provider of the subscription. The subscription characteristics 206 can include, for example, one or more hardware components, quality of such hardware components, price, term, etc.

The conditional dependency process 212 can be trained using historical time-series data related to one or more other subscriptions (e.g., of other customers). As an example, the conditional dependency process 212 can be implemented as a Bayesian network. Generally, a Bayesian network is a probabilistic graphical model that represents a set of variables and their conditional dependencies via a directed acyclic graph (DAG). Accordingly, the Bayesian network can be used to predict the likelihood that any one of the inputs is a contributing factor for an event related to the subscription (e.g., a cancelation of the subscription). It is to be appreciated that the conditional dependency process 212, in some embodiments, can also factor in seasons, holidays, and/or other factors related to the customer's business, for example.

The correlation coefficient process 214 determines the strength or directionality of the relationship (e.g., positive or negative) between the different inputs. In some embodiments, the correlation coefficient process 214 can be used to compare individual elements of the graphs generated by the conditional dependency process 212 for different subscriptions. In at least some embodiments, the correlation coefficient process 214 can be implemented using a Spearman correlation coefficient.

The linear regression process 216 may employ a machine learning algorithm that is trained in a supervised manner to perform a regression task. In the FIG. 2 example, the linear regression process 216 is trained to predict a particular time period to take one or more actions with respect to the subscription (e.g., to avoid the subscription being canceled).

The multiple linear regression process 218 obtains a historical linear regression output 220 determined for other data (e.g., corresponding to other customers and/or other datacenters), and correlates the output of the linear regression process 216 with the historical linear regression output 220. Accordingly, the linear regression process 216, in some embodiments, can be trained for a specific datacenter, and the multiple linear regression process 218 can then be used to smooth the output for that datacenter based on data from other customers and/or other datacenters.

The classifier model 222 can determine a priority of at least one action to take by comparing the current subscription with subscriptions of other customers (e.g., one or more customers that eventually canceled their respective subscriptions). The classifier model 222 can make this determination by obtaining data corresponding to the date and term 224 and a rate card type 226. In some embodiments, the classifier model 222 may be implemented as a Naïve Bayes classifier model. Generally, a Naïve Bayes classifier model is a probabilistic machine learning model based on Bayes Theorem, where each pair of features is assumed to be independent, and each feature is given the same importance. In the FIG. 2 example, a Naïve Bayes classification model can be trained to classify the current subscription based at least in part on the date and term 224 and the rate card type 226, and the classification can be used to determine the priority of the one or more actions to take. It is to be appreciated that the classifier model 222 can consider other types of features, such as customer types and/or geographic regions of customers. The classifier model 222 can then output a determined period and priority 228.

In some situations, a given customer can have multiple different subscriptions. According to one or more embodiments, two or more of the subscriptions that have a similar classification can be combined into a single group when identifying the time period to take one or more actions. For example, the subscriptions can be combined when the subscriptions share the same workload and application class.

FIG. 3 shows an example of subscription and usage data 300 for a particular customer in an illustrative embodiment. In this example, the customer is initially associated with nine subscriptions (Sub-1, . . . , Sub-9) having different workloads (Analytics, Enterprise Resource Planning (ERP), eCommerce (eComm)), and different application classes (production (prod), pre-prod, and dev (development)). The period for each subscription indicates the committed duration of a given subscription, and the rate card type indicates the type of price commitment. The consumption of storage data in terabytes (TBs) for Sub-1, . . . , Sub-9 is shown for months 13-24 (labeled as M13-M24 in FIG. 3). Although not shown, it is assumed that the consumption of storage data steadily increased for the first twelve months for the nine subscriptions. FIG. 3 also shows that three new subscriptions were added in month 13 (Sub-10, Sub-11, and Sub-12).

The subscription and usage data 300 represents advantages of some embodiments for identifying periods of usage decline relative to existing techniques. Generally, existing techniques incorrectly identify usage decline of sub-1 after M18 (as indicated by dark shading), as they fail to indicate that sub-10 was added with a different contract to shift the workload from sub-1. One or more embodiments described herein automatically correlate the usage and subscription data to avoid generating such a false positive. As another example, growth begins to slow in M18 for sub-3 (as identified by dark shading) and should be identified as a period of usage decline. However, existing approaches will not detect a period of usage decline until M20, since the growth remains above the average growth rate. For sub-12, growth stopped in M18, and usage began to decline in M20 (as indicated by dark shading). Existing approaches do not consider the growth pattern of sub-12 with respect to sub-7, and thus incorrectly determine a period of usage decline for sub-12 at M18, when the period of usage decline should have been identified at M16.

Figure 4:
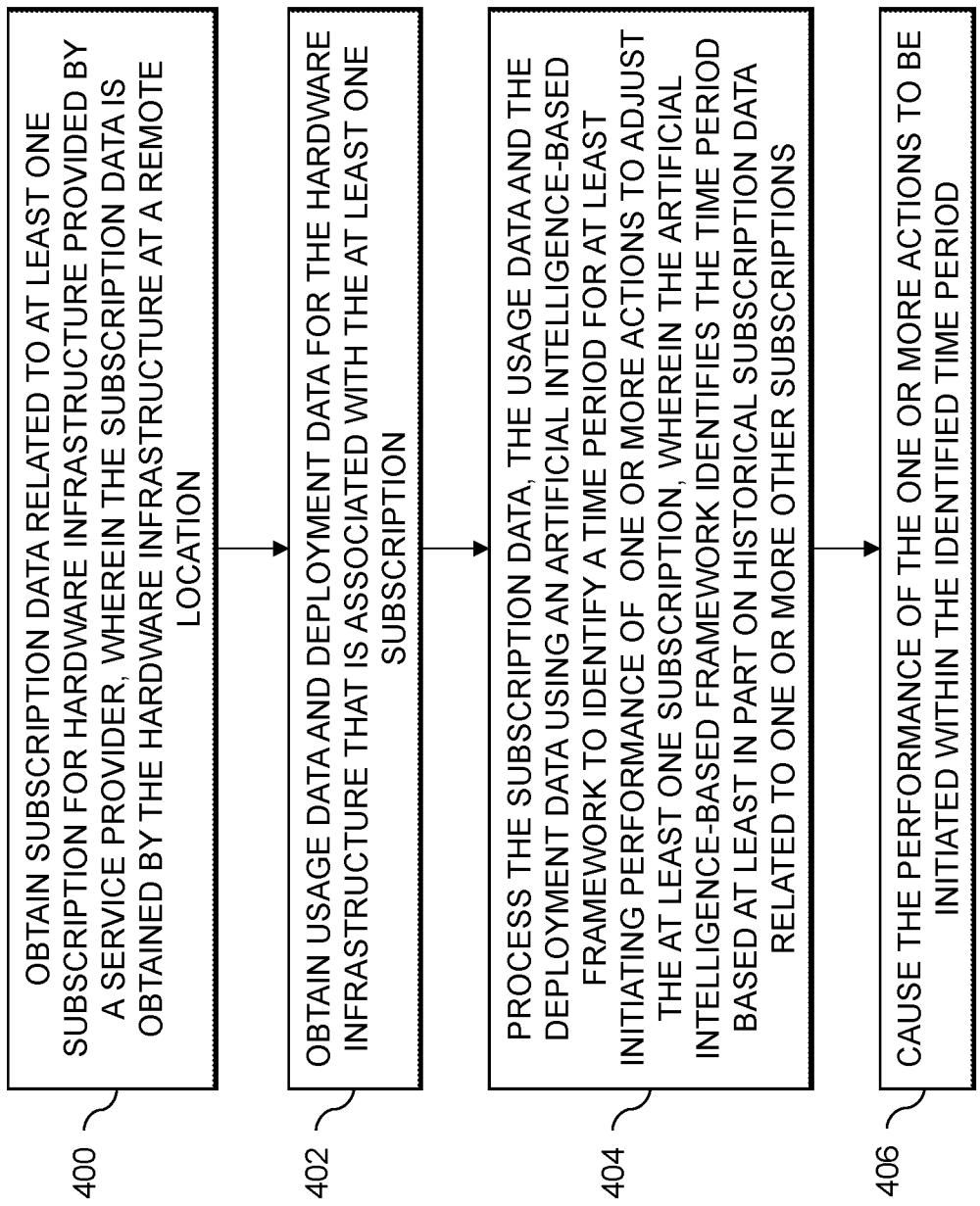
FIG. 4 shows a flow diagram of a process for automated subscription management for remote infrastructure in an illustrative embodiment.

FIG. 4 is a flow diagram of a process for automated subscription management for remote infrastructure in an illustrative embodiment. It is to be understood that this particular process is only an example, and additional or alternative processes can be carried out in other embodiments.

In this embodiment, the process includes steps 400 through 406. These steps are assumed to be performed at least in part by the remote device 102-1 utilizing its elements 110 and 112.

Step 400 includes obtaining subscription data related to at least one subscription for hardware infrastructure provided by a service provider, wherein the subscription data is obtained by the hardware infrastructure at a remote location. Step 402 includes obtaining usage data and deployment data for the hardware infrastructure that is associated with the at least one subscription. Step 404 includes processing the subscription data, the usage data and the deployment data using an artificial intelligence-based framework to identify a time period for at least initiating performance of one or more actions to automatically adjust the at least one subscription, wherein the artificial intelligence-based framework identifies the time period based at least in part on historical subscription data related to one or more other subscriptions. Step 406 includes causing the performance of the one or more actions to be initiated within the identified time period.

The one or more actions may include at least one of: adjusting one or more characteristics associated with the at least one subscription; generating one or more plans to adjust one or more characteristics associated with the at least one subscription; and triggering a notification to an entity management system. The one or more characteristics associated with the at least one subscription may include at least one of a subscription length, a usage threshold, and a rate type. The subscription data may relate to a plurality of subscriptions and the artificial intelligence-based framework may identify the time period by combining two or more of the plurality of subscriptions based at least in part on the deployment data. The artificial intelligence-based framework may combine the two or more of the plurality of subscriptions using a correlation coefficient algorithm. The artificial intelligence-based framework may identify the time period using a linear regression model that is trained in a supervised manner. The artificial intelligence-based framework may include a Bayesian network that is dependent on usage patterns related to at least one of: geographic locations associated with an entity corresponding to the at least one subscription, an industry type associated with the entity, transaction information associated with the entity, and operating hours of the entity. The artificial intelligence-based framework may include a multiple linear regression process that correlates the subscription data, the usage data and the deployment data with the historical subscription data. The deployment data may include at least one of: one or more types of applications running on the hardware infrastructure and one or more types of software environments associated with the hardware infrastructure. The subscription data may include at least one of: one or more types of storage services provided by the hardware infrastructure; one or more types of processing services provided by the hardware infrastructure; one or more networking services provided by the hardware infrastructure; a contract duration; a renewal date; and a type of subscription. The one or more actions may be performed based at least in part on a priority level derived for the at least one subscription, wherein the derived priority level is based at least in part on the subscription data. The subscription data may be obtained by the hardware infrastructure via a machine-to-machine protocol from a service provider location that is different than the remote location Accordingly, the particular processing operations and other functionality described in conjunction with the flow diagram of FIG. 4 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to significantly improve subscription management techniques by proactively identifying and addressing issues with one or more subscriptions in substantially real time. These and other embodiments can effectively overcome problems associated with existing management techniques that rely on analysis of usage data reports that are generated at fixed periods of time (e.g., on a monthly basis) and that fail to account for usage patterns that are specific to a given customer.

It is to be appreciated that some embodiments described herein utilize one or more artificial intelligence models. It is to be appreciated that the term "model," as used herein, is intended to be broadly construed and may comprise a set of executable instructions for generating computer-implemented recommendations and/or predictions. For example, one or more of the models described herein may be trained to generate predictions based on subscription data and/or usage data collected from various hardware components (e.g., corresponding to remote devices 102), and such predictions can be used to initiate one or more automated actions (e.g., automatically adjusting a configuration of a subscription associated with one or more of the remote devices 102).

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. Although described in the context of system 100, these platforms may also be used to implement at least portions of other information processing systems in other embodiments.

Figure 5:
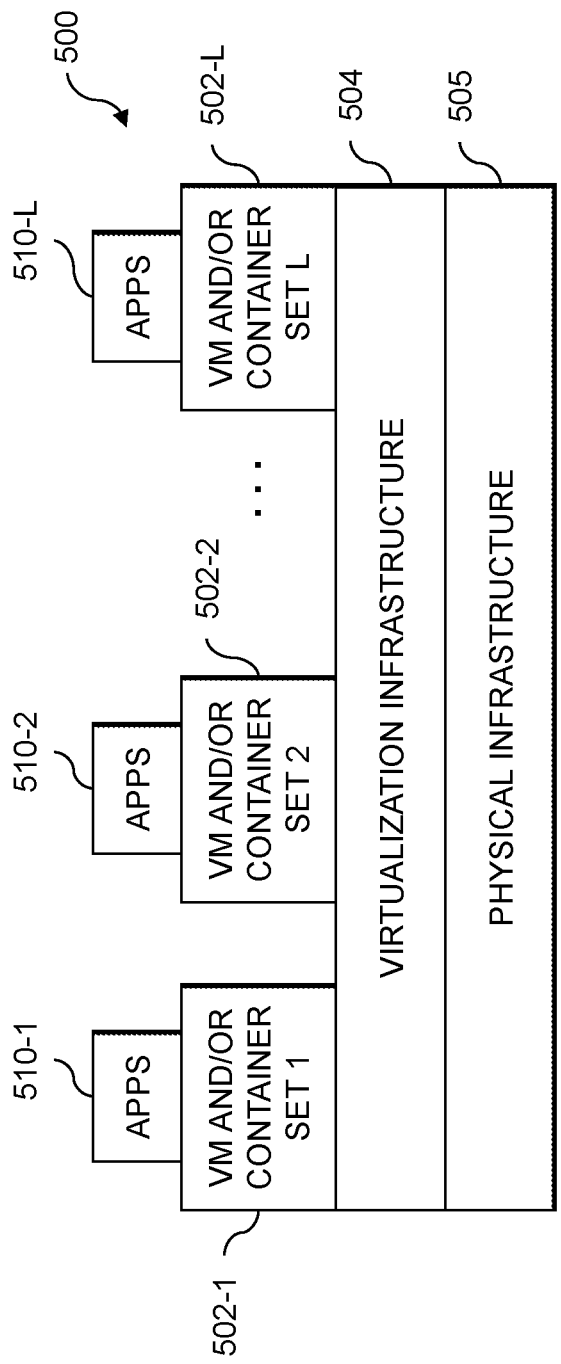
FIGS. 5 and 6 show examples of processing platforms that may be utilized to implement at least a portion of an information processing system in illustrative embodiments.
Figure 6:
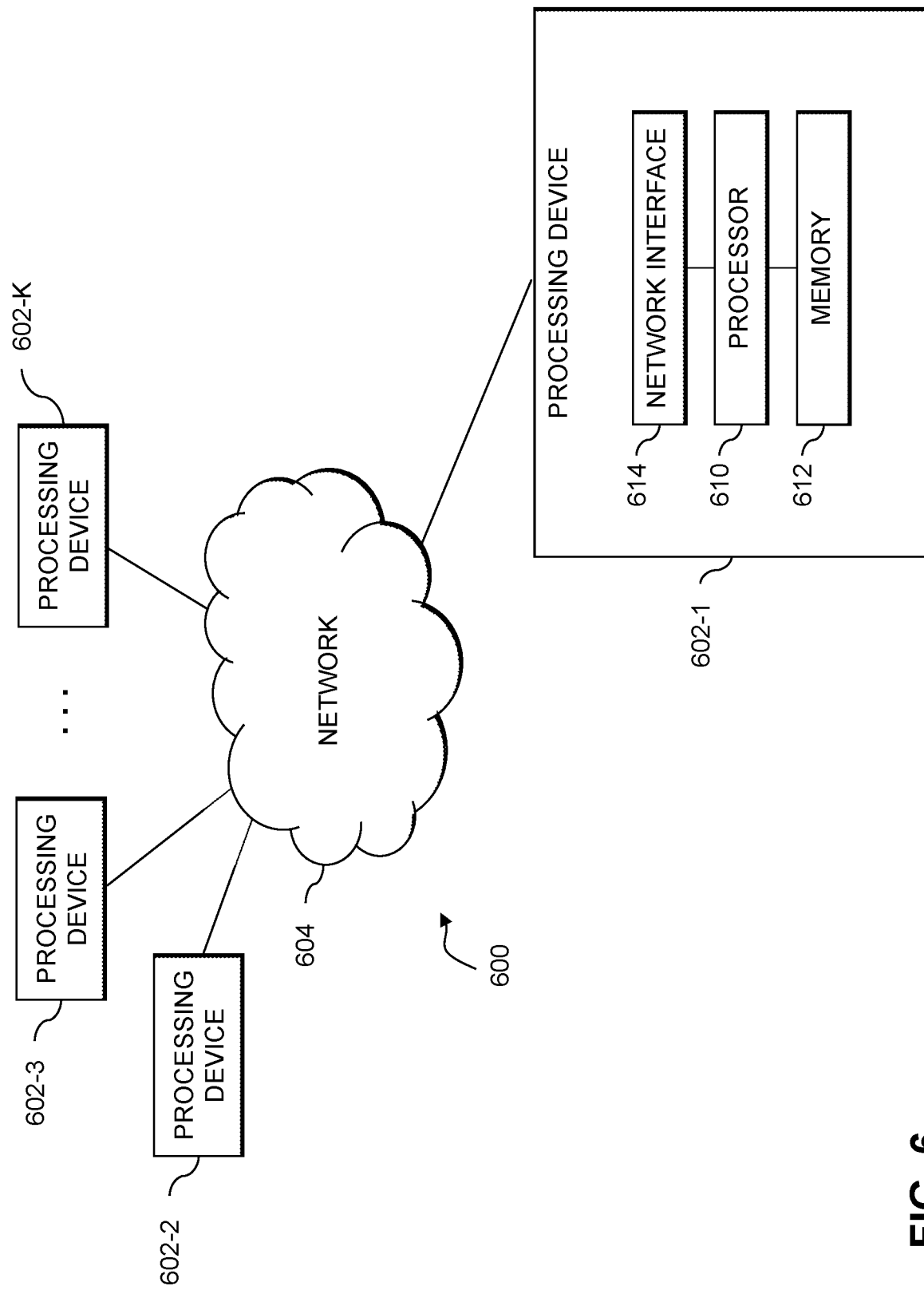

FIG. 5 shows an example processing platform comprising cloud infrastructure 500. The cloud infrastructure 500 comprises a combination of physical and virtual processing resources that are utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 comprise respective VMs, respective sets of one or more containers, or respective sets of one or more containers running in VMs. In some implementations of the FIG. 5 embodiment, the VMs/container sets 502 comprise respective VMs implemented using virtualization infrastructure 504 that comprises at least one hypervisor.

A hypervisor platform may be used to implement a hypervisor within the virtualization infrastructure 504, wherein the hypervisor platform has an associated virtual infrastructure management system. The underlying physical machines comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 602-1 in the processing platform 600 comprises a processor 610 coupled to a memory 612.

The processor 610 comprises a microprocessor, a microcontroller, an ASIC, an FPGA or other type of processing circuitry, as well as portions or combinations of such circuitry elements.

The memory 612 comprises RAM, ROM or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
    obtaining subscription data related to at least one subscription for hardware infrastructure provided by a service provider, wherein the subscription data is obtained by the hardware infrastructure at a remote location;
    obtaining usage data and deployment data for the hardware infrastructure that is associated with the at least one subscription;
    processing the subscription data, the usage data and the deployment data using an artificial intelligence-based framework to identify a time period for at least initiating performance of one or more actions to automatically adjust the at least one subscription, wherein the artificial intelligence-based framework identifies the time period based at least in part on historical subscription data related to one or more other subscriptions; and
    causing the performance of the one or more actions to be initiated within the identified time period;
    wherein the method is performed by at least one processing device comprising a processor coupled to a memory.

2. The computer-implemented method of claim 1, wherein the one or more actions comprise at least one of:
    adjusting one or more characteristics associated with the at least one subscription;
    generating one or more plans to adjust one or more characteristics associated with the at least one subscription; and
    triggering a notification to an entity management system.

3. The computer-implemented method of claim 2, wherein the one or more characteristics associated with the at least one subscription comprises at least one of a subscription length, a usage threshold, and a rate type.

4. The computer-implemented method of claim 1, wherein the subscription data relates to a plurality of subscriptions and the artificial intelligence-based framework identifies the time period by combining two or more of the plurality of subscriptions based at least in part on the deployment data.

5. The computer-implemented method of claim 4, wherein the artificial intelligence-based framework combines the two or more of the plurality of subscriptions using a correlation coefficient algorithm.

6. The computer-implemented method of claim 1, wherein the artificial intelligence-based framework identifies the time period using a linear regression model that is trained in a supervised manner.

7. The computer-implemented method of claim 1, wherein the artificial intelligence-based framework comprises a Bayesian network that is dependent on usage patterns related to at least one of: geographic locations associated with an entity corresponding to the at least one subscription, an industry type associated with the entity, transaction information associated with the entity, and operating hours of the entity.

8. The computer-implemented method of claim 1, wherein the artificial intelligence-based framework comprises a multiple linear regression process that correlates the subscription data, the usage data and the deployment data with the historical subscription data.

9. The computer-implemented method of claim 1, wherein the deployment data comprises at least one of: one or more types of applications running on the hardware infrastructure and one or more types of software environments associated with the hardware infrastructure.

10. The computer-implemented method of claim 1, wherein the subscription data comprises at least one of: one or more types of storage services provided by the hardware infrastructure; one or more types of processing services provided by the hardware infrastructure; one or more networking services provided by the hardware infrastructure; a contract duration; a renewal date; and a type of subscription.

11. The computer-implemented method of claim 1, wherein the one or more actions are performed based at least in part on a priority level derived for the at least one subscription, wherein the derived priority level is based at least in part on the subscription data.

12. The computer-implemented method of claim 1, wherein the subscription data is obtained by the hardware infrastructure via a machine-to-machine protocol from a service provider location that is different than the remote location.

13. A non-transitory processor-readable storage medium having stored therein program code of one or more software programs, wherein the program code when executed by at least one processing device causes the at least one processing device:
to obtain subscription data related to at least one subscription for hardware infrastructure provided by a service provider, wherein the subscription data is obtained by the hardware infrastructure at a remote location;
to obtain usage data and deployment data for the hardware infrastructure that is associated with the at least one subscription;
to process the subscription data, the usage data and the deployment data using an artificial intelligence-based framework to identify a time period for at least initiating performance of one or more actions to automatically adjust the at least one subscription, wherein the artificial intelligence-based framework identifies the time period based at least in part on historical subscription data related to one or more other subscriptions; and
to cause the performance of the one or more actions to be initiated within the identified time period.

14. The non-transitory processor-readable storage medium of claim 13, wherein the one or more actions comprise at least one of:
adjusting one or more characteristics associated with the at least one subscription;
generating one or more plans to adjust one or more characteristics associated with the at least one subscription; and
triggering a notification to an entity management system.

15. The non-transitory processor-readable storage medium of claim 14, wherein the one or more characteristics associated with the at least one subscription comprises at least one of a subscription length, a usage threshold, and a rate type.

16. The non-transitory processor-readable storage medium of claim 13, wherein the subscription data relates to a plurality of subscriptions and the artificial intelligence-based framework identifies the time period by combining two or more of the plurality of subscriptions based at least in part on the deployment data.

17. An apparatus comprising:
at least one processing device comprising a processor coupled to a memory;
the at least one processing device being configured:
to obtain subscription data related to at least one subscription for hardware infrastructure provided by a service provider, wherein the subscription data is obtained by the hardware infrastructure at a remote location;
to obtain usage data and deployment data for the hardware infrastructure that is associated with the at least one subscription;
to process the subscription data, the usage data and the deployment data using an artificial intelligence-based framework to identify a time period for at least initiating performance of one or more actions to automatically adjust the at least one subscription, wherein the artificial intelligence-based framework identifies the time period based at least in part on historical subscription data related to one or more other subscriptions; and
to cause the performance of the one or more actions to be initiated within the identified time period.

18. The apparatus of claim 17, wherein the one or more actions comprise at least one of:
adjusting one or more characteristics associated with the at least one subscription;
generating one or more plans to adjust one or more characteristics associated with the at least one subscription; and
triggering a notification to an entity management system.

19. The apparatus of claim 18, wherein the one or more characteristics associated with the at least one subscription comprises at least one of a subscription length, a usage threshold, and a rate type.

20. The apparatus of claim 17, wherein the subscription data relates to a plurality of subscriptions and the artificial intelligence-based framework identifies the time period by combining two or more of the plurality of subscriptions based at least in part on the deployment data.

* * * * *